3,686,196
POLYMERS OF THIADIAZOLE
William J. Considine, Somerset, N.J., and Raymond Seltzer, New York, N.Y., assignors to M & T Chemicals Inc., New York, N.Y.
No Drawing. Filed Feb. 1, 1968, Ser. No. 702,211
Int. Cl. C08d 13/10; C08g 33/02
U.S. Cl. 260—302 SD                                    3 Claims

ABSTRACT OF THE DISCLOSURE

In accordance with certain of its aspects, this invention relates to novel compositions and to a process for preparing a polymer comprising recurring units of the formula:

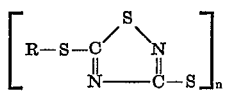

in which R is selected from the group consisting of alkylene, activated arylene, aralkylene, activated alkarylene, and divalent heterocyclic groups and $n$ is an integer at least 2, which comprises reacting (i) a difunctional compound of the formula:

X—R—X in which X is a halogen radical or an ester group of a lower carboxylic acid with (ii) a stable metal perthiocyanate; and recovering said polymer.

---

This invention relates to a process for preparing polymers of thiadiazole and to the novel polymers so prepared. More particularly, it relates to a novel process for preparing polymers containing the recurring units of 3,5-dimercapto-1,2,4 thiadiazole and to the novel products so prepared.

It is an object of this invention to provide a new class of polymeric compositions containing heterocyclic thiadiazole rings. It is a further object of this invention to provide a novel process for preparing these new compounds. Other objects will be apparent to those skilled-in-the-art from inspection of the following description.

In accordance with certain of its aspects, the novel process for preparing the new polymeric composition of this invention containing recurring units of the formula:

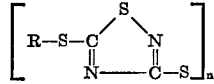

in which R is selected from the group consisting of alkylene, activated arylene, aralkylene, activated alkarylene, alkenylene in which the double bond is attached to a carbon atom other than the alpha-carbon atom, and divalent heterocyclic groups, and $n$ is an integer at least 2, may comprise reacting (i) a difunctional compound X—R—X in which X is a halogen radical or an ester group of a lower carboxylic acid with (ii) a stable metal perthiocyanate thereby forming said polymeric composition; and recovering said polymeric composition.

The metal perthiocyanates which may be used in the process of this invention may be those which are stable and readily available. Suitable salts may include perthiocyanates of copper, aluminum, iron, magnesium, alkali metals including sodium, potassium, etc.; preferably the alkali metal salts of perthiocyanic acid which may be employed for the process may be prepared conveniently by reacting the readily available isoperthiocyanic acid with an alkali metal hydroxide in aqueous alcoholic medium. Typically where it is desired to use the sodium salt, it may be prepared by the reaction of one mole of isoperthiocyanic acid with preferably about two moles of e.g. sodium hydroxide, as follows:

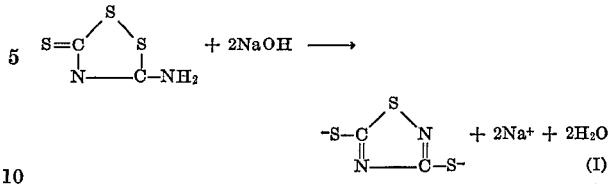

It is preferred to prepare the metal salt of perthiocyanic acid in situ just prior to the reaction with the difunctional compound X—R—X. Typical salts which may be employed include sodium perthiocyanate, potassium perthiocyanate, magnesium perthiocyanate, iron perthiocyanate, aluminum perthiocyanate, and copper perthiocyanate. The preferred salt may be sodium perthiocyanate.

The difunctional compound X—R—X used in practice of the process of this invention may contain the replaceable group X. In this compound, X may be selected from the group consisting of halogens and esters of lower carboxylic acids, and R may be a divalent hydrocarbon radical preferably selected from the group consisting of alkylene, activated arylene, cycloalkylene, activated alkylene, aralkylene, and alkenylene in which the double bond is attached to a carbon atom other than the alpha-carbon atom, including such radicals when inertly substituted.

When R is alkylene, it may typically be straight chain alkylene or branched alkylene, including methylene, ethylene, n-propylene, isopropylene, n-butylene, isobutylene, sec-butylene, tert-butylene, n-amylene, neopentylene, iso-amylene, n-hexylene, isohexylene, heptylenes, octylenes, decylenes, dodecylenes, tetradecylene, octadecylenes, etc. Preferred alkylene includes lower alkylene, i.e., having less than about 8 carbon atoms, i.e., octylenes and lower. When R is alkylene, it may typically be allylene, 1-propenylene, methallylene, buten-1-ylene, buten-2-ylene, buten-3-ylene, penten-1-ylene, hexenylene, heptenylene, octenylene, decenylen, dodecenylene, tetradecenylene, octadecenylene, etc. When R is cycloalkylene, it may typically be cyclopentylene, cyclohexylene, cycloheptylene, cyclooctylene, etc. When R is aralkylene, it may typically be benzylene, β-phenylethylene, γ-phenylpropylene, β-phenylpropylene, etc. R may be inertly substituted, e.g., may bear a non-reactive substituent such as alkyl, aryl cycloalkyl, aralkyl, alkaryl, alkenyl, ether, nitro, etc. Typical substituted alkylenes, cycloalkylenes, and aralkylenes include 2-ethoxyethylene, carboethoxymethylene, p-phenylbenzylene, p-methylbenzylene, etc.

R may also be an activated arylene or alkarylene which contains substituents in the aromatic ring which facilitate the cleavage of the replaceable groups X in the reaction with the thiadiazole. Typical activated arylene or alkarylene radicals may contain one or more substituents such as —NO$_2$, —CN, CF$_3$, and SO$_2$R' in the aromatic ring whereing R' may be an alkyl radical. Arylene or alkarylene radicals which may be particularly effective for the reaction with thiadiazoles include those containing substituents in the ortho and para positions with respect to the replaceable groups X, including those represented by the formula:

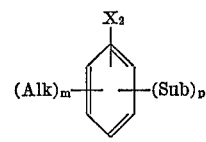

where (Sub) represents substituents, $p$ is an integer 1–4, preferably 2–4 (Alk) represents an alkyl radical, and $m$ is zero or an integer not greater than the available positions in the ring.

When R is a divalent heterocyclic group, the compound may have two replaceable groups attached to either the heterocyclic ring or to inert substituents of the heterocyclic compound. Typical examples of compounds of this type include the triazine derivative containing two replaceable halogen groups.

The compound X—R—X preferably may be a compound in which X is a halogen i.e., chlorine, bromine, or iodine, attached on an alkyl portion of the compound. When X is a residue of an ester of carboxylic acid (i.e. typically a radical of the form —R'COOR"), the acid radical R' may preferably contain less than four carbon atoms. Typical examples of the replaceable acid groups include the acetate and propionate radicals. Alkylating agents which have been found to be eminently suitable include those having the following formulas:

$$X(CH_2)_m X$$

and

in which m is at least one and X is preferably a halogen. Preferably both X groups may be the same.

Typical illustrative difunctional compounds may include 2,2'-dichloro-p-xylene; 1,4-dibromobutane; 1,4-dichlorobutane; 1,3-dibromopropane; ethylene glycol diacetate, 1,4-butanediol dipropionate; 1,4-dichlorobutyne; 1,4-dibromobutyne; etc.

In practice of the process of this invention, in accordance with certain of its aspects, metal perthiocyanate and the difunctional compound X—R—X, may preferably be reacted in solvent capable of at least partially dissolving the reactants. Inert organic solvent may be used, typically including alkanols such as methonal and ethanol; ketones such as acetone or methyl ethyl ketone; and ethers such as dioxane and tetrahydrofuran. The amount of reaction medium used may be sufficient to maintain the reaction in a liquid medium.

The reaction may preferably be carried out at ambient temperature over a wide temperature range. Preferably the reaction may be carried out at a temperature of 0° C. to 100° C. More preferably the temperature of reaction may be 15°–30° C.

The relative proportions of the two reactants, the metal perthiocyanate and the difunctional compound X—R—X, used in the process may vary depending on the reactants and the resultant composition desired. For a polymer containing the successive recurring unit

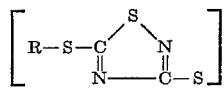

the molar ratio of the reactants preferably may be about 1:1 i.e. equimolar. A slight excess of the difunctional compound may be used in certain cases with beneficial results.

Reaction may be carried out by adding X—R—X in solution in e.g. organic solvent such as ethanol, tetrahydrofuran, etc., to the sodium salt of the acid in alcohol. The reaction mixture may rise in temperature due to the exothermic heat of reaction. During the process, the reactants may react as follows:

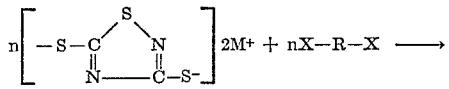

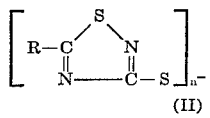

(II)

The reaction may continue with agitation, after the reactants are mixed, for 8–16 hours. The product may be prepared in yields approaching stoichiometric.

Recovery of the polymeric composition from the reaction mixture may depend on the physical properties of the specific product and upon the solvents used. The solvent selected for the process may preferably be one in which the product may be soluble at elevated temperatures and insoluble at lower temperatures, thereby permitting ready recovery as by filtration. The novel products of this invention may be useful for blowing catalysts, for the production of urethane foams, as fungicides, as peroxide inhibitors, etc.

Further to illustrate this invention, specific examples are described hereinbelow wherein all parts are parts by weight unless otherwise set forth:

Example I.—Polymer of p-xylyl perthiocyanate

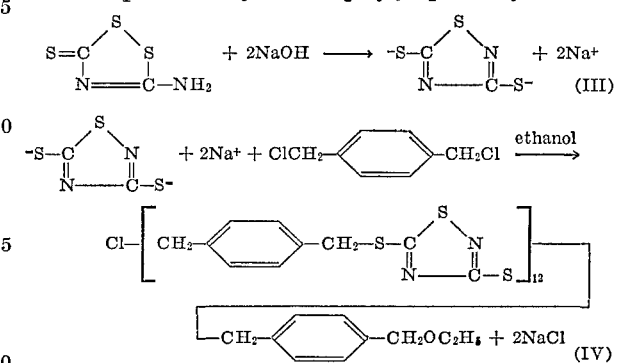

50.0 parts (0.33 mole) of isoperthiocyanic acid may be added to a solution of 26.8 parts of sodium hydroxide in 50 parts of water and 160 parts of 95% ethanol. The mixture may be stirred until solution results and then filtered to remove insolubles. A solution of 58.5 parts of α-α'-dichloro-p-xylene in 180 parts of tetrahydrofuran may be added dropwise to the filtrate. The temperature may rise from room temperature to 40° C. during the addition. After the addition was completed, the reaction mixture may be stirred at room temperature overnight and then filtered. The residue may be washed three times with 2000 parts of hot tap water and then dried at 110° C. The yield may be 91%. An analytical sample of the polymer melting at 170° C.–180° C. may be obtained by recrystallization from dimethylformamide.

Elemental analysis for $S_{130}H_{106}ClN_{24}OS_{36}$.—Calculated (percent): C, 48.6; H, 3.13; Cl, 1.1; N, 10.5; S, 35.9; mol. wt. 3205. Found (percent): C, 48.16; H, 3.3; Cl, 1.1; N, 10.4; S, 36.0; mol. wt. (Rast in Camphor) 2960.

Example II.—Polymer (cyclic trimer) of butylene perthiocyanate

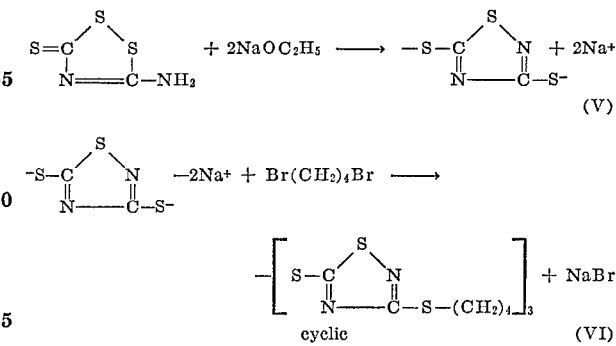

50.0 parts of isoperthiocyanic acid may be added to a sodium ethoxide solution prepared by dissolving sodium in 480 parts of absolute ethanol. The mixture may be stirred until solution is formed and then filtered to remove insolubles. While stirring the filtrate at room temperature, a solution of 1,4-dibromobutane in 80 parts of absolute ethanol may be added dropwise over a 20 minute period. The temperature may rise to 35° C. during the addition; the reaction mixture may then be stirred overnight at room temperature. The reaction mixture may be filtered and the residue washed with water and then dried in the vacuum oven at 60° C./1 mm. to yield 27.0 parts of product (40% yield). The crude product may be suspended in 800 parts of chloroform and heated to boiling with stirring. After filtering, the residue may have a melting point of 114° C.–122° C. On cooling the filtrate an additional 4.0 parts of second product may be obtained and having a melting point of 115° C.–125° C. Mixture of the two products may have a melting point of 113° C.–125° C. and the infrared spectra of the two products may be identical. An additional recrystallization of the second product from chloroform may give no change in the melting point.

Elemental analysis for ($C_6H_8N_2S_3$).—Calculated (percent): C, 35.3; H, 3.9; N, 13.7; S, 47.0; mol. wt. 612. Found (percent): C, 35.5; H, 4.0; N, 13.1; S, 46.6; mol. wt. (Rast in phenol) 675.

Although this invention has been illustrated by reference to specific embodiments, modifications thereof which are clearly within the scope of the invention will be apparent to those skilled-in-the-art.

We claim:

1. A polymer comprising recurring units of the formula:

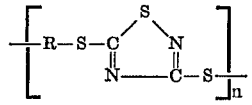

in which R is selected from the group consisting of

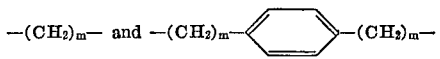

in which $m$ is an integer of from 1 to 10 and $n$ is an integer between 2 and 12, inclusive.

2. A cyclic trimer of the formula:

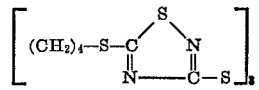

3. A polymer of the formula:

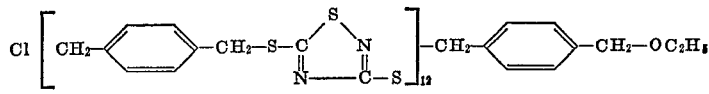

References Cited
UNITED STATES PATENTS 3,212,892   10/1965   Von Konig _____ 96—29

JOSEPH L. SCHOFER, Primary Examiner

C. A. HENDERSON, Jr., Assistant Examiner

U.S. Cl. X.R.

252—399; 260—2.5 AE, 79.7; 424—269